UNITED STATES PATENT OFFICE.

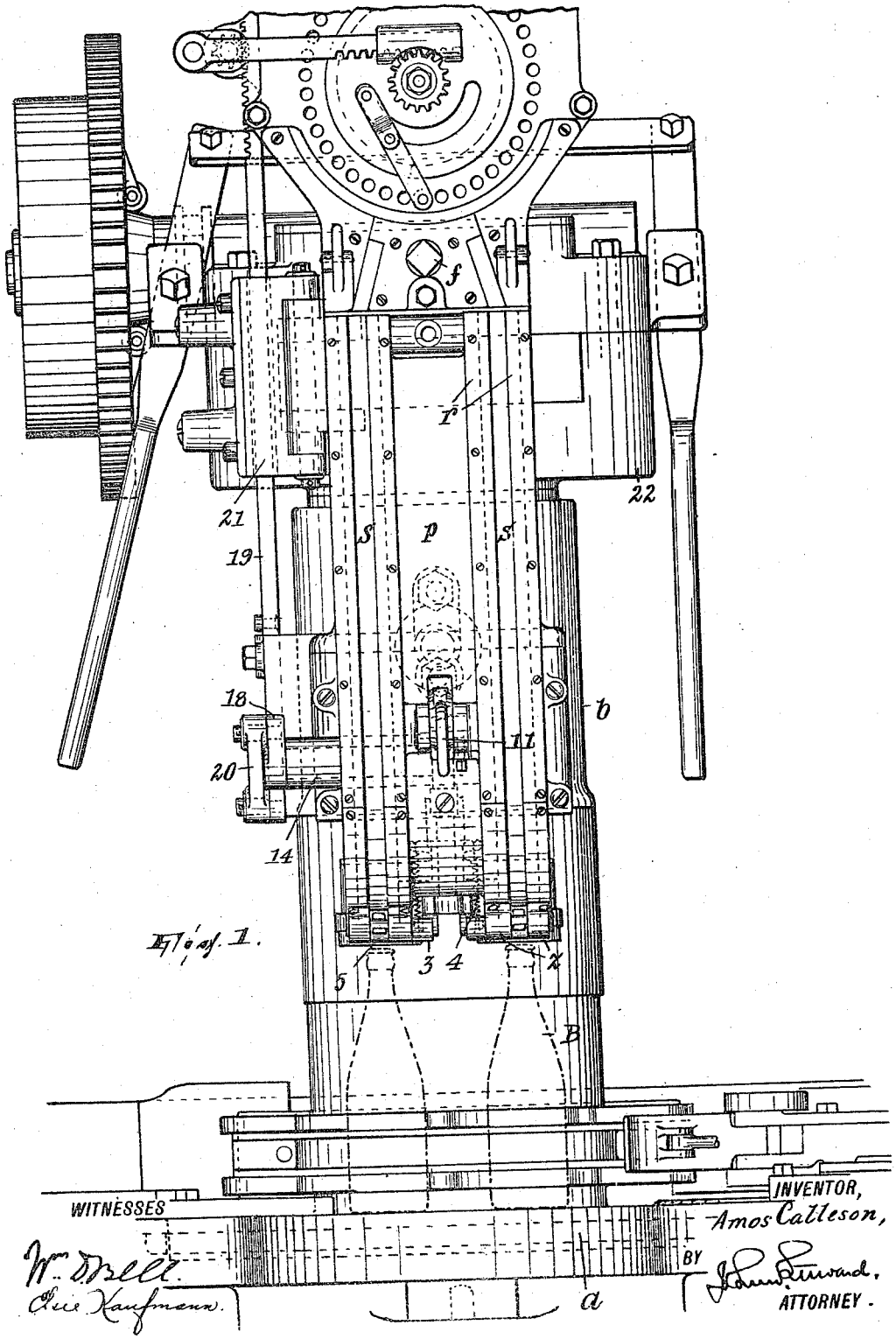

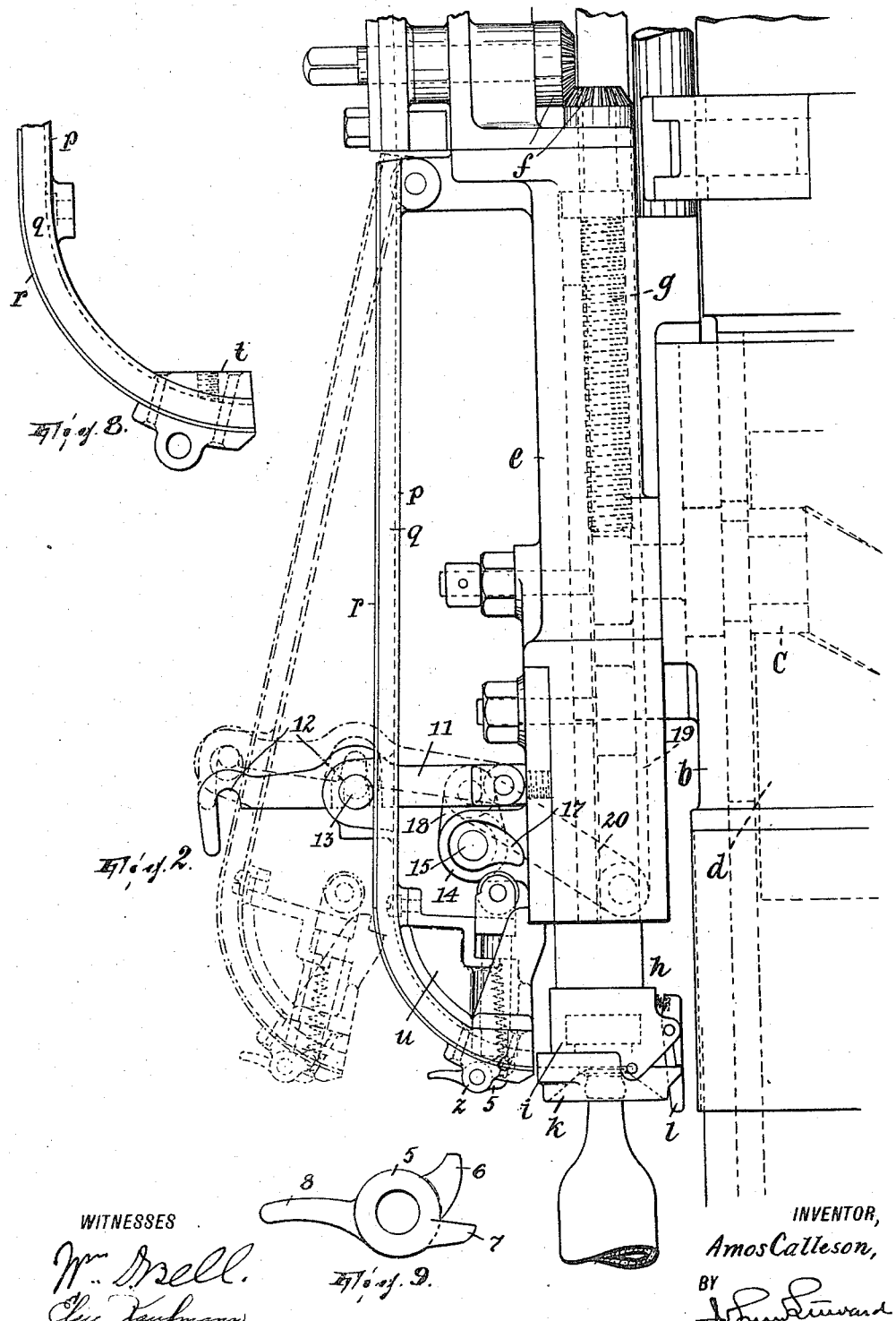

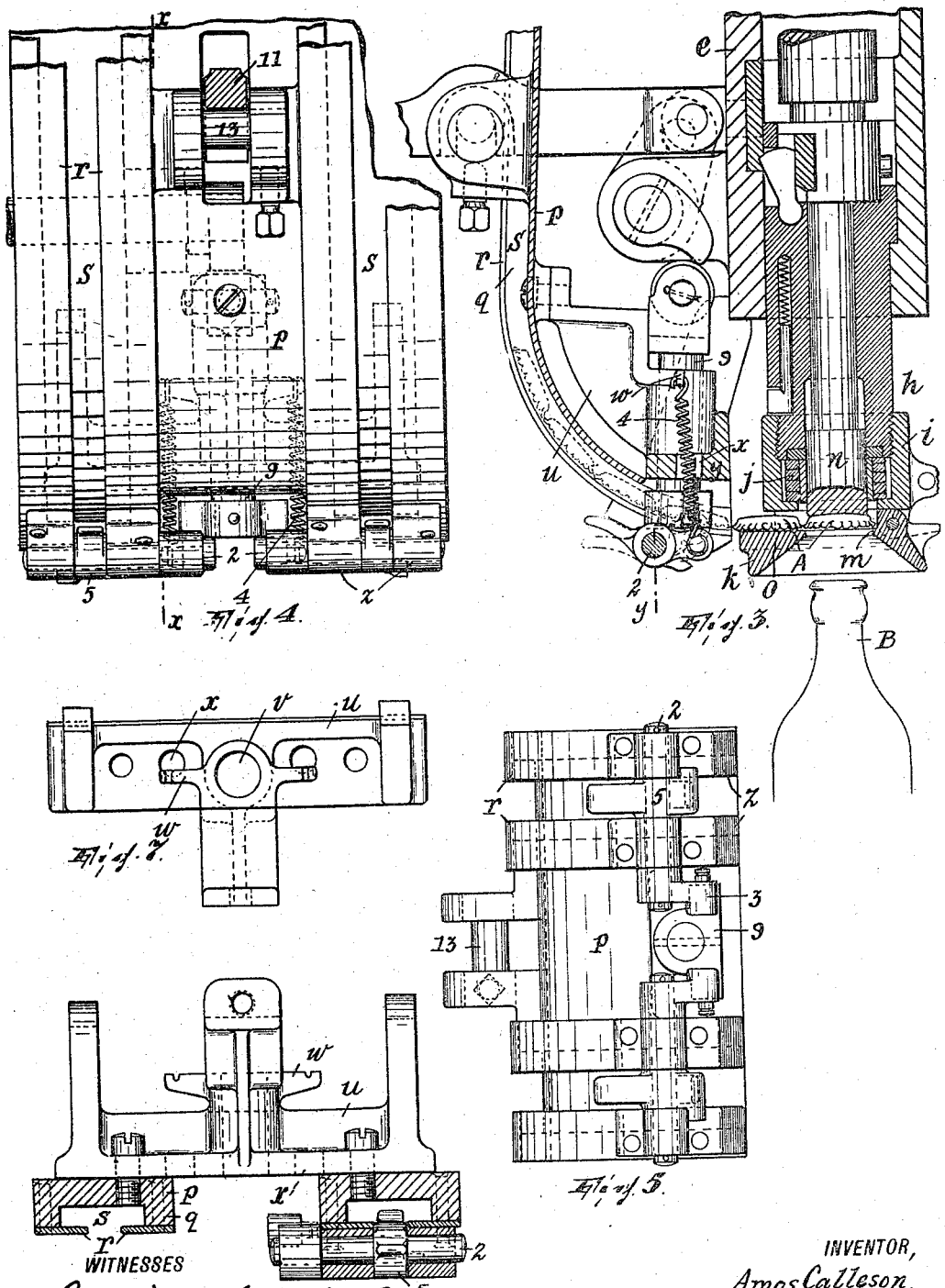

AMOS CALLESON, OF BROOKLYN, NEW YORK, ASSIGNOR TO BENJAMIN ADRIANCE, OF BROOKLYN, NEW YORK.

BOTTLE-SEALING MACHINE.

1,260,964.   Specification of Letters Patent.   Patented Mar. 26, 1918.

Application filed October 15, 1913. Serial No. 795,211.

*To all whom it may concern:*

Be it known that I, AMOS CALLESON, a citizen of the United States, residing at Brooklyn, in the county of Kings and State of New York, have invented certain new and useful Improvements in Bottle-Sealing Machines, of which the following is a specification.

This invention relates to bottle sealing machines of the class employing a chute or the like to deliver the closures to the sealing head, and it has in view certain novel combinations and arrangements of the means for exerting sealing pressure on the bottles and closures, the chute and means for controlling the feed of the closures through the chute designed to simplify the construction of the machine and insure a more perfect functioning and coöperation of its sealing and closure-supplying organisms.

In the accompanying drawings,

Figure 1 is a front elevation of a bottle sealing machine of the type of that illustrated in my application Serial No. 750516 and illustrating the present invention;

Fig. 2 is an enlarged side elevation of that part of said machine directly including the invention;

Fig. 3 is a vertical sectional view through one of the sealing heads and the chute structure and certain adjuncts, the plane of the section being centrally through the sealing head and on the line $x$—$x$ in Fig. 4 through the chute structure.

Fig. 4 is an enlarged front elevation, partly broken away, of the chute structure and certain adjuncts;

Fig. 5 is an underneath plan of the chute structure and certain adjuncts;

Fig. 6 is a lower end view of the chute structure partly in section on the line $y$—$y$ in Fig. 3 as seen from the front;

Fig. 7 is a plan view of a bracket forming a part of the chute structure;

Fig. 8 is a side elevation of the lower end of said chute structure with the bracket removed; and, Fig. 9 is a side elevation of the closure checking pawl.

Briefly describing the machine shown in Fig. 1, and partially in Fig. 2, $a$ designates means to support the bottle or bottles (in the present case two) operated upon in each cycle of the machine, while $b$ is a suitably guided cylindrical carrier having a roller $c$ that runs in the groove of a barrel cam $d$ housed in the carrier (the cam and roller appearing in dotted outline in Fig. 2) and suitably supported and rotated on a vertical axis; $e$ is a sealing head carrying structure adapted to be adjusted vertically in the carrier $b$ by the means $f$ including a rotary screw $g$ tapped into a part of the carrier and swiveled in said structure; and $h$ denotes the sealing heads which, in accordance substantially with the construction shown in my Patent No. 1,078,607, dated November 18th, 1913, may, whenever a bottle is presented that exceeds a predetermined height, yield or recede upwardly into the structure $e$, each being returned to its downward limit (Fig. 2) by a spring (not shown) or otherwise when the displacing influence ceases. The cylindrical carrier, with its adjuncts, has also an oscillatory movement around the axis of the cam $d$, but as this is not material to the present invention the manner in which such movement is effected need not be herein explained. Each sealing head includes a holder $i$ for the sealing throat or sealing appliance $j$ and, pivoted to the holder so as to swing downwardly, the flaring mouth piece $k$ normally held in the position shown by the latch $l$ (Fig. 2). The mouth piece has an annular seat $m$ on which a closure A may rest directly above a bottle B in proper position to undergo the sealing operation, being held down against said seat by the plunger $n$, and extending laterally into said mouth piece and formed in its upper surface is a recess $o$ affording a guideway for the closures terminating at said seat and a platform on which a closure A to succeed that already on the seat $m$ may temporarily rest.

The chute structure includes an elongated plate of metal $p$ straight or flat as to its major portion and having its lower end portion bent or curved out of the plane of its major portion, said plate having on its relatively outer side two pairs of parallel ribs $q$ which, with the spaced strips $r$ secured upon and extending longitudinally of them, form the chutes proper $s$. Against the concave surface of the plate and upon a seat $t$ (Fig. 8) formed thereon by thickening the lower end portion thereof, is secured a bracket $u$ having a central vertical bearing or guide $v$, two lateral hooks $w$ projecting from the guide and two openings $x$ below the hooks. In a pair of brackets $z$ secured against each pair of strips $r$ at the lower end of the chute is journaled a rock-shaft 2 having an arm 3 that is connected with the corresponding hook $w$ by a spring 4 penetrating the corresponding opening $x$. On each rock shaft, between the members of each pair of strips $r$, is also fixed a clamping pawl 5 (Fig. 9) whose nose 6 is normally held by spring 4 projecting into the corresponding chute proper to a limit afforded by the engagement of a lateral stop 7 thereon against one of the strips, 8 being a handle whereby to manually retract the pawl against the tension of the spring 4. In the guide $v$ is vertically movable a plunger 9 whose lower end impinges upon the arms 3 and whose upper end carries a roller as shown in Figs. 2 and 3.

The chute structure normally occupies a fixed position in the structure $e$, but it is pivoted thereto at its upper end so that it may be swung outwardly more or less clear of the sealing head (see dotted lines, Fig. 2). To hold it in either of the positions shown in Fig. 2 there is provided a hook 11 that is pivoted to the structure $e$ and has two notches 12 either of which may receive a stud 13 on the chute structure.

On the structure $e$ is a bracket 14 in which is journaled a horizontal rock shaft 15 carrying a pawl 17 to impinge the roller of the plunger 9 and also having fixed thereto a crank 18 that is connected to a part 19 by the link 20. The part 19 in the present instance is a rod that is normally fixed against vertical movement; this rod is held by a grip device 21 that permits slippage of the rod vertically when the structure $e$ is adjusted by the means $f$, said grip device, suitably held against vertical movement by the superstructure 22 of the machine, being pivotally movable horizontally in the adaptation shown, so as to follow carrier $b$ horizontally as it oscillates around the axis of cam $c$.

Operation: At the inception of each cycle of operation of the machine the structure $e$ is elevated to its highest position, the sealing heads stand depressed therein to their lowest positions under the influence of their springs aforesaid, and link 20, attached to rod 19, acts to hold pawls 17 in depressing relation to the plungers 9, so that the clamping devices 5 leave the trains or lines of closures free in response to the action of gravity to force the lowest closure in each train onto the seat $m$ of the sealing head. On the descent of said structure, since the link is held at one end by said rod against movement it turns back the pawl 17 as the latter descends with said structure, allowing the springs 4 to force the clamping devices against the two closures that happen to adjoin them and clamp them against the wall $p$ of the chute structure, thus holding back all of the closure train, excepting the two in sealing position (on the sealing head seats $m$) and two others that rest on the ledges or platforms $o$. This operation preferably occurs before the structure $e$ descends sufficiently to bring the two closures on seats $m$ against the bottle mouths, so that when this occurs and as the structure $e$ continues further to descend to accomplish the sealing the pressure of the closure trains is not operative to cause interference between the closures being applied and those resting on seats $m$, the two closures resting on the ledges $o$, being thus unencumbered by the rest of the closure-trains, being loose and hence not calculated to offer any obstruction whatever to the closure and bottle undergoing sealing; furthermore, the clamping action of the devices 5 continues until, on the upward stroke of structure $e$, the sealing head has cleared the now-applied closures and the ledges $o$ are in re-alinement with the chutes. On the upward stroke, pawl 17 at the last moment is brought by the link 20 into depressing relation to plungers 9, whereby the checks are again caused to release the closure trains, allowing fresh closures to assume positions on the seats $m$ and ledges $o$.

Having thus fully described my invention, what I claim as new and desire to secure by Letters Patent is:—

1. In combination, with the frame having means to support the bottles, a vertically movable structure arranged in the frame and including a sealing head and a closure supply chute for the sealing head, the sealing head and chute forming a vertically adjustable part of said structure, and an adjustable closure-feed controlling train of parts having one part thereof movable in said structure, another part thereof attached to the frame and a third part thereof a link connecting the two first-named parts.

2. In combination, with the frame having means to support the bottles, a vertically movable structure arranged in the frame and including a sealing head and a closure supply chute for the sealing head, the sealing head and chute forming a vertically adjustable part of said structure, and a closure-feed controlling train of parts having one part thereof movable in said structure, another part thereof vertically adjustably attached to the frame and a third part thereof a link connecting the two first-named parts.

3. In combination, with a supporting structure, a closure-feeding chute, closure-feed controlling means for the chute including a plunger guided by said structure, a rocking device adapted to impinge against the plunger, and means to oscillate the rocking device.

4. In combination, with a fixed structure and a vertically movable structure arranged in the fixed structure and including a closure feeding chute, closure-feed controlling means for the chute, including a plunger guided by said structure, a rocking device adapted to impinge against the plunger, and means to oscillate the rocking device including a link pivotally connecting the rocking device with a part of said fixed structure.

In testimony whereof I affix my signature in presence of two witnesses.

AMOS CALLESON.

Witnesses:
F. H. MOSES,
JAMES J. BURNS.

Copies of this patent may be obtained for five cents each, by addressing the "Commissioner of Patents, Washington, D. C."